United States Patent

Yamazaki et al.

[11] Patent Number: 5,273,948
[45] Date of Patent: Dec. 28, 1993

[54] BONDING GLASS FOR ASSEMBLING A MAGNETIC HEAD, AND A MAGNETIC HEAD

[75] Inventors: Masanobu Yamazaki, Mooka; Kazumi Noguchi, Saitama, both of Japan

[73] Assignee: Hitachi Metals, Ltd., Tokyo, Japan

[21] Appl. No.: 903,334

[22] Filed: Jun. 24, 1992

[30] Foreign Application Priority Data

Jun. 24, 1991 [JP] Japan ................... 3-15198

[51] Int. Cl.$^5$ .................. C03C 3/072; C03C 3/102; C03C 3/105
[52] U.S. Cl. .................. 501/75; 360/119; 360/120; 360/126; 360/103; 360/104; 501/74
[58] Field of Search ............. 501/74, 75; 360/119, 360/120, 126, 103, 104

[56] References Cited

U.S. PATENT DOCUMENTS 4,997,796 3/1991 Toyoshima et al. ............. 501/75
5,029,032 7/1991 Yamada et al. ............. 360/126

FOREIGN PATENT DOCUMENTS 62-36040 2/1987 Japan .
63-206330 8/1988 Japan .
2-124745 5/1990 Japan .
2-137745 5/1990 Japan .

OTHER PUBLICATIONS

Chem. Abstract 108:136470j correspond to EPA 254198; Jan. 27, 1988.
Chem. Abstract 112:123984n correspond to JP 01-203240, Aug. 16, 1989.

*Primary Examiner*—Karl Group
*Assistant Examiner*—C. M. Bonner
*Attorney, Agent, or Firm*—Staas & Halsey

[57] ABSTRACT

A bonding glass for assembling a magnetic head by bonding a magnetic core to a non-magnetic ceramic slider. The magnetic core has a gap and an Fe-Al-Si film within the gap. The bonding glass includes $SiO_2$ in the range of 6 to 11 wt %, $B_2O_3$ in the range of 5 to 9 wt %, $Al_2O_3$ in the range of 2 to 5 wt %, PbO in the range of 55 to 70 wt %, $Bi_2O_3$ in the range of 5 to 15 wt %, $TeO_2$ in the range of 1 to 10 wt % and CuO in the range of 0.5 to 2 wt %. A part of the PbO in PbO-$SiO_2$-$B_2O_3$-$Al_2O_3$ glass is replaced with $TeO_2$ and $Bi_2O_3$ and, at the same time, CuO is added in order to prevent the formation of a heterophase. Glass color change under high temperature and high humidity is prevented.

8 Claims, 6 Drawing Sheets

| No | OBSERVED PICTURE (×50) | RESULT |
|---|---|---|
| G |  | × |
| H |  | ○ |

BONDING GLASS FOR ASSEMBLING A MAGNETIC HEAD, AND A MAGNETIC HEAD

BACKGROUND OF THE INVENTION

1. Field of the Invention

This invention relates to bonding glass for the assembly of a composite type magnetic head comprising a magnetic core consisting of ferromagnetic ferrite, such as Mn-Zn ferrite, and a non-magnetic ceramic slider. This invention also relates to a magnetic head with which the bonding glass is used and, more specifically, to a Metal-In-Gap (hereinafter called MIG) composite type magnetic head, wherein an Fe-Al-Si film is applied to at least one of the faces containing the gap.

2. Related Art

An MIG composite type magnetic head consists of, as shown in FIG. 1, a slider 12 provided with side rails 11, a magnetic core 14 embedded in a slit 13 positioned at the end of one of the side rails 11, and a glass section 15 fixing and holding the magnetic core 14 in place.

FIG. 2 is an enlarged explanatory perspective drawing of the magnetic core 14. Portions 21 and 22 consist of magnetic substances called a C-type core piece and an I-type core piece respectively, and are made of Mn-Zn ferrite or the like. Portion 23 is an Fe-Al-Si film applied to the I-type core piece 22.

When assembling a composite type magnetic head, as shown in FIG. 3, the magnetic core 14 is inserted into the slit 13 of the slider 12 and is temporarily fixed by a spring 31.

Then a glass rod 32 is placed on the slider 12 at the position shown in FIG. 3, where it is heated to a high temperature, causing the glass to melt and flow into the gaps 33 and 34 between the slider 12 and the magnetic core 14.

Nevertheless, if the aforementioned temperature is too high, the glass in the gap of the magnetic core 14 may become loose, causing the gap to widen or the magnetic characteristics of the Fe-Al-Si film 23 may deteriorate, resulting in deterioration of the overall magnetic head characteristics.

Consequently, it is necessary to use low-melting point glass for the assembly of magnetic heads. The inventor of the present invention has thus proposed a low-melting point bonding glass composed of

| $SiO_2$: 4.5 to 8.5 wt %, | $B_2O_3$: 4.5 to 9.5 wt %, |
|---|---|
| $Al_2O_3$: 6 to 8 wt % | and PbO: 77.5 to 82.5 wt %. |

(Japanese Patent Laid-Open No. 35619/1990)

Nevertheless, although the melting point of the proposed low-melting point glass is low enough for assembly of magnetic heads, discoloration occurs under conditions of high temperature and high humidity.

Besides the proposed low-melting point bonding glass, other of bonding glass as shown in Table 1 have been proposed.

(Japanese Patent Laid-Open No. 124745/1990)

TABLE 1

| Items | Glass | | | | |
|---|---|---|---|---|---|
| | A | B | C | D | E |
| PbO | 54 | 49 | 49 | 45 | 55 |
| $TeO_2$ | 18 | 22 | 22 | 23 | 13 |
| $BiO_2$ | 13 | 17 | 17 | 12 | 16 |
| $B_2O_3$ | 8 | 9 | 8 | 10 | 8 |

TABLE 1-continued

| Items | Glass | | | | |
|---|---|---|---|---|---|
| | A | B | C | D | E |
| $SiO_2$ | 0 | 0 | 4 | 10 | 8 |
| $Al_2O_3$ | 7 | 3 | 0 | 0 | 0 |
| Thermal expansion coefficient ($\times 10^{-7}/°C.$) | 109 | 104 | 105 | 100 | 110 |
| Setting temperature (°C.) | 460 | 440 | 450 | 490 | 450 |

Nevertheless, these other types of glass tend to be subject to cracking when used as bonding glass for assembly of composite type magnetic heads, due to their inadequate thermal expansion coefficient values.

SUMMARY OF THE INVENTION

A first object of this invention, therefore, is to provide a glass possessing an adequate thermal expansion coefficient and a low melting point suitable for the assembly of the MIG composite type magnetic head, and being resistant to discoloration under high temperature and high humidity conditions.

A second object of this invention is to improve the corrosion resistance under high temperature and high humidity conditions of the bonding glass used for the assembly of magnetic heads.

These and other objects of the present invention will become more apparent from the following description related to the attached drawings and descriptions of what is claimed.

As a result of comprehensive research in relation to the aforementioned objects, the inventor of the present invention has developed a type of bonding glass with a low melting point, with satisfactory moisture resistance and with an adequate thermal expansion coefficient by optimum selection of the ratios of $SiO_2$, PbO, $TeO_2$ and $Bi_2O_3$ content.

Also through actual production of the MIG composite type head for test purposes using such a bonding glass containing $TeO_2$ and $Bi_2O_3$, it was found that CuO needed to be added, thus resulting in the present invention.

The composition of the bonding glass for assembly of composite type magnetic heads according to the present invention includes

| $SiO_2$: 6 to 11 wt %, | $B_2O_3$: 5 to 9 wt %, |
|---|---|
| $Al_2O_3$: 2 to 5 wt %, | PbO: 55 to 70 wt %, |
| $Bi_2O_3$: 5 to 15 wt %, | $TeO_2$: 0 to 10 wt %, and |
| CuO: 0.5 to 2 wt %. | |

In the above, a part of the PbO contained in the PbO-$SiO_2$-$B_2O_3$-$Al_2O_3$ glass is replaced by $TeO_2$ and $Bi_2O_3$, and CuO is added to prevent heterophase deposition.

By the use of the aforementioned glass as the bonding glass for the assembly of composite type magnetic heads, discoloration under conditions of high temperature and high humidity can be prevented.

BRIEF DESCRIPTION OF THE DRAWINGS

FIG. 8 shows metallic structure photographs showing the presence/absence of discoloration.

DETAILED DESCRIPTION OF THE PREFERRED EMBODIMENTS

Embodiments of the present invention are explained below using the attached drawings.

EXPERIMENT 1

As examples of this invention and as Comparative examples, MIG composite type magnetic heads were actually made for test purposes using the twelve different types of glass that are presented in Tables 1 and 2.

TABLE 2

| No. | $SiO_2$ | $B_2O_3$ | $Al_2O_3$ | PbO | $TeO_2$ | $Bi_2O_3$ | CuO | Softening point (°C.) | Thermal expansion coefficient ($\times 10^{-7}$/°C.) |
|-----|---------|----------|-----------|-----|---------|-----------|-----|-----------------------|------------------------------------------------------|
| F | 6 | 7 | 7 | 80 | | | | 428 | 92 |
| G | 8.5 | 5 | 5 | 66.5 | 6 | 9 | | 435 | 97 |
| H | 8.5 | 5 | 5 | 65.5 | 6 | 9 | 1 | 432 | 96 |
| I | 11 | 7 | 2 | 69 | | 10 | 1 | 433 | 96 |
| J | 6 | 9 | 4 | 55 | 10 | 15 | 1 | 430 | 101 |
| K | 8.5 | 5 | 5 | 61.5 | 10 | 9 | 1 | 437 | 97 |
| L | 10 | 5 | 4 | 70 | 5 | 5 | 1 | 431 | 96 |

*Measuring range of thermal expansion coefficient was 30° C. to 280° C.

The test-production conditions of this experiment were as follows:

The magnetic core used for the test production consists of a C-type core piece and I-type core piece made of single crystal Mn-Zn ferrite having a thermal expansion coefficient of $120 \times 10^{-7}$/° C., with an Fe-Al-Si film of approximately 2 $\mu$m thickness applied to the surface of the I-type core piece facing the gap.

Non-magnetic ceramics made of CaTiOs having a thermal expansion coefficient of $114 \times 10^{-7}$/° C. were used as the slider material.

Figure 1:
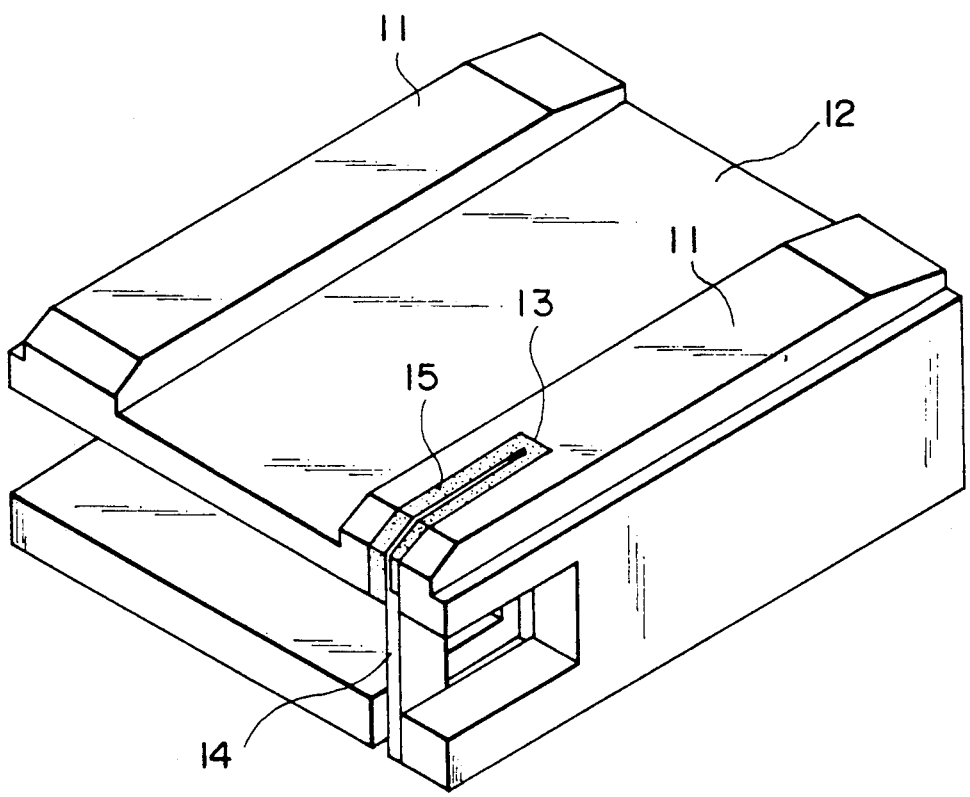
FIG. 1 is a perspective drawing of a composite type magnetic head.
Figure 2:
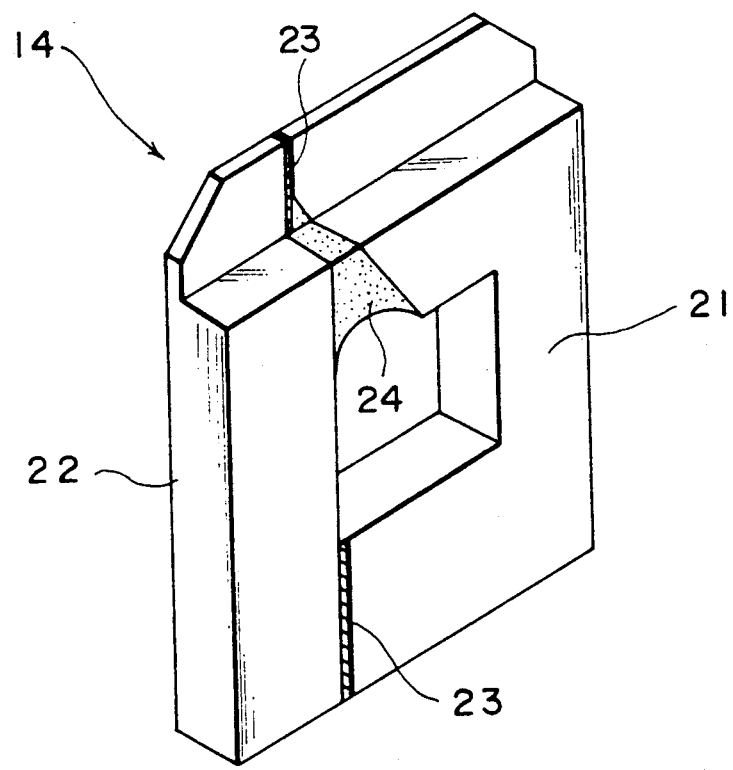
FIG. 2 is an enlarged perspective drawing of a magnetic core for assembly into a composite type magnetic head.
Figure 3:
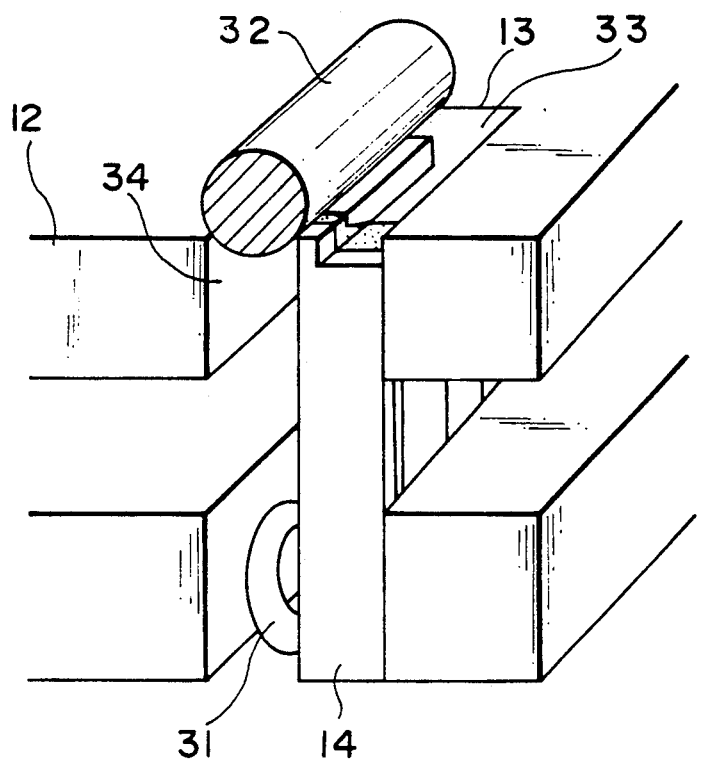
FIG. 3 shows a step of a method for assembling a magnetic head.
Figure 4:
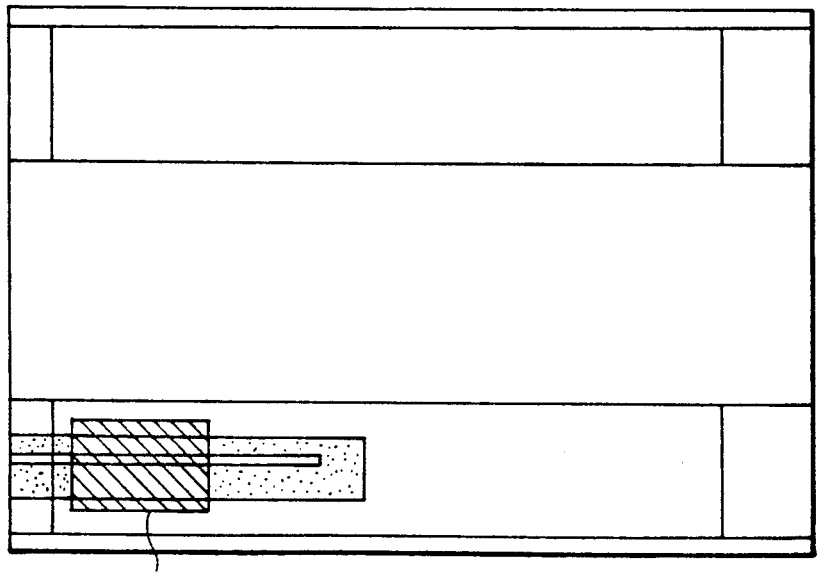
FIG. 4 shows an observed point used in a dark-field observation.
Figure 5:
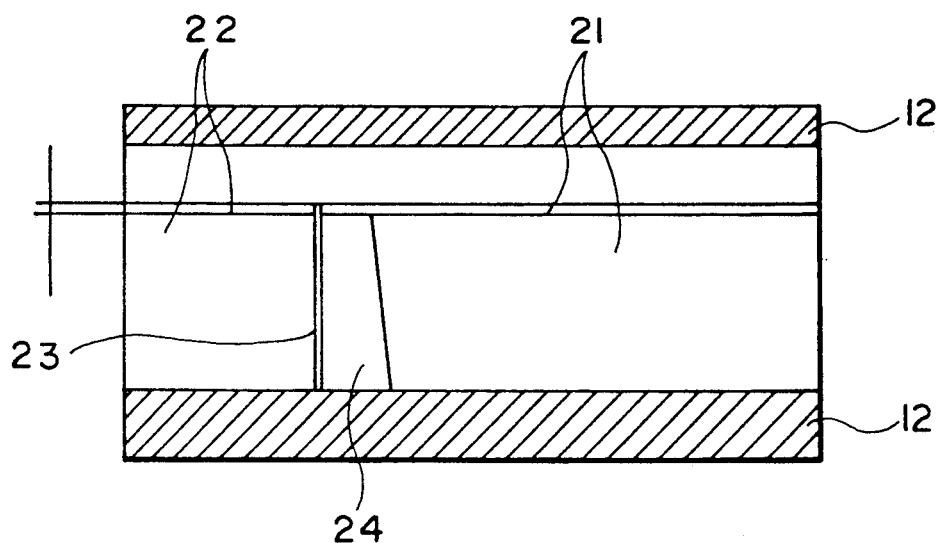
FIG. 5 illustrates an observed picture that is observed in the dark-field observation.
Figure 6:
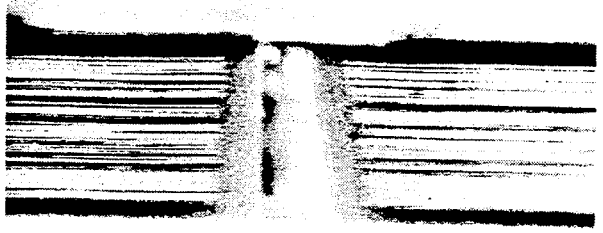
FIG. 6 shows metallic structure photographs showing the presence/absence of a heterophase.
Figure 6:

Such magnetic cores and sliders, plus the twelve types of glass to be used in this experiment were assembled as shown in FIG. 3 and heated under nitrogen atmosphere conditions. After cooling, the side rails of each of the magnetic heads were polished to finish the magnetic heads. Dark-field observation of the glass section of magnetic heads thus completed was performed using a metallurgical microscope. FIG. 4 shows the observed point 41 and FIG. 5 illustrates the observed picture, respectively. The observation results are provided in Table 3 and in the metallic structure photographs shown in FIG. 6.

TABLE 3

| No. | Glass cracking occurrence ratio (%) | Remarks |
|-----|-------------------------------------|---------|
| A | 100 (%) | Foreign matter generation |
| B | 100 (%) | Foreign matter generation |
| C | 100 (%) | Foreign matter generation |
| D | 100 (%) | Foreign matter generation |
| E | 100 (%) | Foreign matter generation |
| F | 1 (%) | — |

TABLE 3-continued

| No. | Glass cracking occurrence ratio (%) | Remarks |
|-----|-------------------------------------|---------|
| G | 0 (%) | Foreign matter generation |
| H | 2 (%) | — |
| I | 6 (%) | — |
| J | 0 (%) | — |
| K | 1 (%) | — |
| L | 0 (%) | — |

As these results indicate, five types of glass, A through E in Table 1, possess inadequate thermal expansion coefficients for application to an MIG composite type magnetic head.

With the types of glass, A through E and G, which contain $TeO_2$ and $Bi_2O_3$ but not CuO, the heterophase was observed near the borders of the C-type core piece 21 and I-type core piece 22 with the reinforcement glass 24.

However, with the types of glass, H through L, containing 1 wt % of CuO and with the type of glass, F, not containing $TeO_2$ and $Bi_2O_3$, the heterophase was not found.

The presence of the heterophase within the bonding glass for the assembly of composite type magnetic heads is undesirable for the reasons that:

1. it becomes difficult to measure the gap depth; and
2. the CSS (Contact-Start-Stop) characteristics are adversely affected.

EXPERIMENT 2

The moisture resistance of the glass portions was checked in the following experiments using the magnetic heads made for test purposes under Experiment 1 by use of the types of glass, F and H through L, in Table 2. Among the above, F is the type of glass described in Japanese Laid-Open No. 35169/1990.

Figure 7:
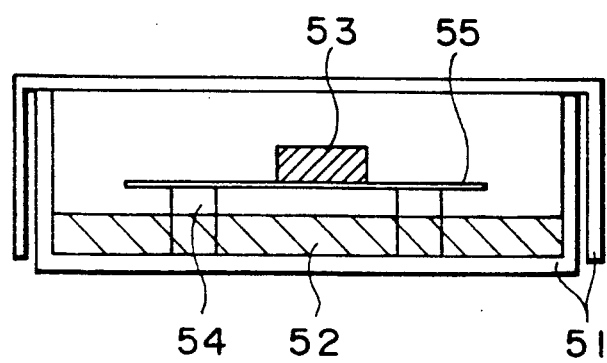
FIG. 7 shows a moisture resistance testing apparatus.

FIG. 7 shows a moisture resistance testing apparatus. A sample magnetic head 53 is placed in a base of a Petri dish 51 containing demineralized water 52, in such a manner that the magnetic head 53 does not directly contact the demineralized water 52, then a lid of the Petri dish 51 is placed over the base of the Petri dish 51 to seal the magnetic head 53 and demineralized water 52 inside. The Petri dish 51 is heated to 70° C., and after 48 hours, the magnetic head 53 is taken out to compare color change in the glass section with the color prior to starting the experiment. Table 4 shows the results.

TABLE 4

| No. | Results |
|-----|---------|
| F | x |
| H | o |
| I | o |

TABLE 4-continued

| No. | Results |
| --- | --- |
| J | o |
| K | o |
| L | o | o: Glass color unchanged
x: Glass color changed

Here, ○ indicates that the glass color did not change and × indicates that there were color-changed portions. FIG. 8 shows a typical example of glass color change and a typical example where glass color did not change.

The five types of glass, H through L, can be selected from the twelve types of glass, A through L, as types of glass which exhibited no negative results in Experiments 1 and 2.

The range of $SiO_2$ content is limited to 6 to 11 wt %, because the moisture resistance deteriorates if the content is below this range and the softening point rises if the content is above, both conditions being unfit for bonding glass for the assembly of MIG composite type magnetic heads.

Also, the range of $B_2O_3$ content is set to 5 to 9 wt % because the softening point and thermal expansion coefficient become inadequate if the $B_2O_3$ content is outside this range.

Although $Al_2O_3$ has characteristics that improve water resistance of glass and that widen the vitrification range, when its content is excessive, the softening point of glass rises and crystallization occurs, thus leading to unfavorable results.

Concerning PbO, an excessive content thereof deteriorates moisture resistance although the softening point is lowered, and insufficient PbO content causes the softening point to rise although the moisture resistance is improved. In this way, exceeding the range of 55 to 70 wt % PbO is undesirable.

Regarding $TeO_2$, when an appropriate quantity thereof is contained by replacement with PbO, the moisture resistance is improved but the softening point increases. In this way, deviating from the range of 0 to 10 wt % is undesirable.

$Bi_2O_3$ improves water resistance and moisture resistance when an appropriate quantity is contained by replacement with PbO, but it also increases the softening point and it should be kept within the range of 5 to 15 wt %.

With the type of glass containing $TeO_2$, CuO was found, by Experiment 1, to suppress the deposition of heterophase when an adequate quantity is added. However, if the CuO content exceeds 2 wt %, crystallization of glass occurs. In this way, deviating from the range of 0.5 to 2 wt % CuO is undesirable.

As aforementioned in detail, a composite type magnetic head free from glass color change, even under conditions of high temperature and high humidity, can be produced if the bonding glass of the present invention is used.

Numerous modifications and adaptations of the present invention will be readily apparent to those skilled in the art. Thus, it is intended by the following claims to cover all such modifications and adaptations which fall within the true spirit and scope of the invention.

What I claim is:

1. A bonding glass for assembling a magnetic head by bonding a magnetic core to a slider, the magnetic core having a gap and an Fe-Al-Si film within the gap, the slider being formed of a non-magnetic ceramic material, said bonding glass comprising:
    $SiO_2$ content in the range of 6 to 11 wt %,
    $B_2O_3$ content in the range of 5 to 9 wt %,
    $Al_2O_3$ content in the range of 2 to 5 wt %,
    PbO content in the range of 55 to 70 wt %,
    $Bi_2O_3$ content in the range of 5 to 15 wt %,
    $TeO_2$ content in the range of 1 to 10 wt % and
    CuO content in the range of 0.5 to 2 wt %.

2. A composite magnetic head, comprising:
    a magnetic core having a gap and an Fe-Al-Si film within said gap;
    a slider formed of a non-magnetic ceramic material; and
    a bonding glass bonding said magnetic core to said slider, said bonding glass comprising
    $SiO_2$ content in the range of 6 to 11 wt %,
    $B_2O_3$ content in the range of 5 to 9 wt %,
    $Al_2O_3$ content in the range of 2 to 5 wt %,
    PbO content in the range of 55 to 70 wt %,
    $Bi_2O_3$ content in the range of 5 to 15 wt %,
    $TeO_2$ content in the range of 1 to 10 wt % and
    CuO content in the range of 0.5 to 2 wt %.

3. A bonding glass for bonding a magnetic core to a slider, the magnetic core having a gap and an Fe-Al-Si film within the gap, the slider formed of a non-magnetic ceramic material, said bonding glass consisting essentially of:
    $SiO_2$ content in the range of 6 to 11 wt %;
    $B_2O_3$ content in the range of 5 to 9 wt %;
    $Al_2O_3$ content in the range of 2 to 5 wt %;
    PbO content in the range of 55 to 70 wt %;
    $Bi_2O_3$ content in the range of 5 to 15 wt %;
    $TeO_2$ content in the range of 1 to 10 wt %; and
    CuO content in the range of 0.5 to 2 wt %.

4. A bonding glass as recited in claim 1, wherein:
    $SiO_2$ content is about 8.5 wt %;
    $B_2O_3$ content is about 5 wt %;
    $Al_2O_3$ content is about 5 wt %;
    PbO content is about 65.5 wt %;
    $Bi_2O_3$ content is about 9 wt %;
    $TeO_2$ content is about 6 wt %; and
    CuO content is about 1 wt %;

5. A bonding glass as recited in claim 1, wherein:
    $SiO_2$ content is about 11 wt %;
    $B_2O_3$ content is about 7 wt %;
    $Al_2O_3$ content is about 2 wt %;
    PbO content is about 69 wt %;
    $Bi_2O_3$ content is about 10 wt %; and
    CuO content is about 1 wt %.

6. A bonding glass as recited in claim 1, wherein:
    $SiO_2$ content is about 6 wt %;
    $B_2O_3$ content is about 9 wt %;
    $Al_2O_3$ content is about 4 wt %;
    PbO content is about 55 wt %;
    $TeO_2$ content is about 10 wt %;
    $Bi_2O_3$ content is about 15 wt %; and
    CuO content is about 1 wt %.

7. A bonding glass as recited in claim 1, wherein:
    $SiO_2$ content is about 8.5 wt %;
    $B_2O_3$ content is about 5 wt %;
    $Al_2O_3$ content is about 5 wt %;
    PbO content is about 61.5 wt %;
    $TeO_2$ content is about 10 wt %;
    $Bi_2O_3$ content is about 9 wt %; and
    CuO content is about 1 wt %.

8. A bonding glass as recited in claim 1, wherein:
    $SiO_2$ content is about 10 wt %;
    $B_2O_3$ content is about 5 wt %;
    $Al_2O_3$ content is about 4 wt %;
    PbO content is about 70 wt %;
    $TeO_2$ content is about 5 wt %;
    $Bi_2O_3$ content is about 5 wt %; and
    CuO content is about 1 wt %.

* * * * *